US007850401B1

(12) United States Patent
Hamblet, Jr.

(10) Patent No.: US 7,850,401 B1
(45) Date of Patent: Dec. 14, 2010

(54) METHOD FOR STABILIZING SOIL AGAINST EROSION

(76) Inventor: Tracy E. Hamblet, Jr., 390 Westberry Dr., Rapid City, SD (US) 57702

( * ) Notice: Subject to any disclaimer, the term of this patent is extended or adjusted under 35 U.S.C. 154(b) by 0 days.

(21) Appl. No.: 09/484,363

(22) Filed: Jan. 18, 2000

(51) Int. Cl.
*C09K 17/00* (2006.01)
*E02D 3/12* (2006.01)

(52) U.S. Cl. ...................................... 405/264; 405/303

(58) Field of Classification Search ................ 405/264, 405/263, 258, 303
See application file for complete search history.

(56) References Cited

U.S. PATENT DOCUMENTS

| | | | | |
|---|---|---|---|---|
| 3,690,107 A | * | 9/1972 | Dolfing et al. | 61/36 R |
| 3,798,838 A | * | 3/1974 | Hashimoto et al. | 47/58 |
| 3,850,371 A | | 11/1974 | Trapp | |
| 3,919,849 A | * | 11/1975 | Hessert et al. | 61/36 R |
| 4,126,417 A | | 11/1978 | Edwards | |
| 4,380,600 A | * | 4/1983 | Hosoda et al. | 524/458 |
| 4,409,910 A | | 10/1983 | Hoyle et al. | |
| 4,540,427 A | * | 9/1985 | Helbling | 71/27 |
| 4,755,206 A | * | 7/1988 | Clark | 71/27 |
| 4,775,513 A | | 10/1988 | Marks | |
| 4,797,145 A | * | 1/1989 | Wallace et al. | 71/27 |
| 4,917,304 A | | 4/1990 | Mazzei et al. | |
| 4,919,724 A | * | 4/1990 | Cenisio et al. | 106/199 |
| 5,012,608 A | | 5/1991 | Brown | |
| 5,022,262 A | | 6/1991 | Hulsbergen et al. | |
| 5,120,344 A | * | 6/1992 | Libor et al. | 71/27 |

(Continued)

OTHER PUBLICATIONS

Sojka, R.E. And Lentz, R.D., Polyacrylamide (PAM) A New Weapon in the Fight Against Irrigation-induced Erosion, USDA-ARS Northwest Irrigation & Soils Research Lab Station Note #01-94 (Revised), 1994, 2 pages.

*Primary Examiner*—Christopher J. Novosad
(74) *Attorney, Agent, or Firm*—Jeffrey A. Proehl; Woods, Fuller, Shultz & Smith, PC

(57) ABSTRACT

A method of applying polyacrylamide (PAM) for stabilizing soil particles of a land area from movement about the land area. The slope of the surface of the soil is measured, and a tentative application rate is determined based upon the slope of the land area. The stability of the soil of the land area is determined by placing a sample of the soil in a tray and pouring a liquid over the sample and evaluating the erosion potential of the soil by measuring any movement of the soil in the liquid. The liquid may be water or a mixture of water and PAM. The application rate may be increased above the tentative application rate if the soil sample showed a relatively higher vulnerability to erosion. An application rate is calculated for applying a mixture of PAM and water to the land area. The mixture is misted onto the surface of the land area in one or more mixture applications. An application of the mixture is continued until the top surface of the soil of the land area becomes saturated. Further mixture applications occur after any puddles of the mixture on the surface of the soil have been absorbed into the soil, but the surface of the soil is not permitted to dry. A spray of the mixture is directed onto the surface of the soil of the land area from at least four directions, and at a substantially perpendicular angle downward onto the surface of the soil of the land area.

57 Claims, 3 Drawing Sheets

U.S. PATENT DOCUMENTS

Figure 1:
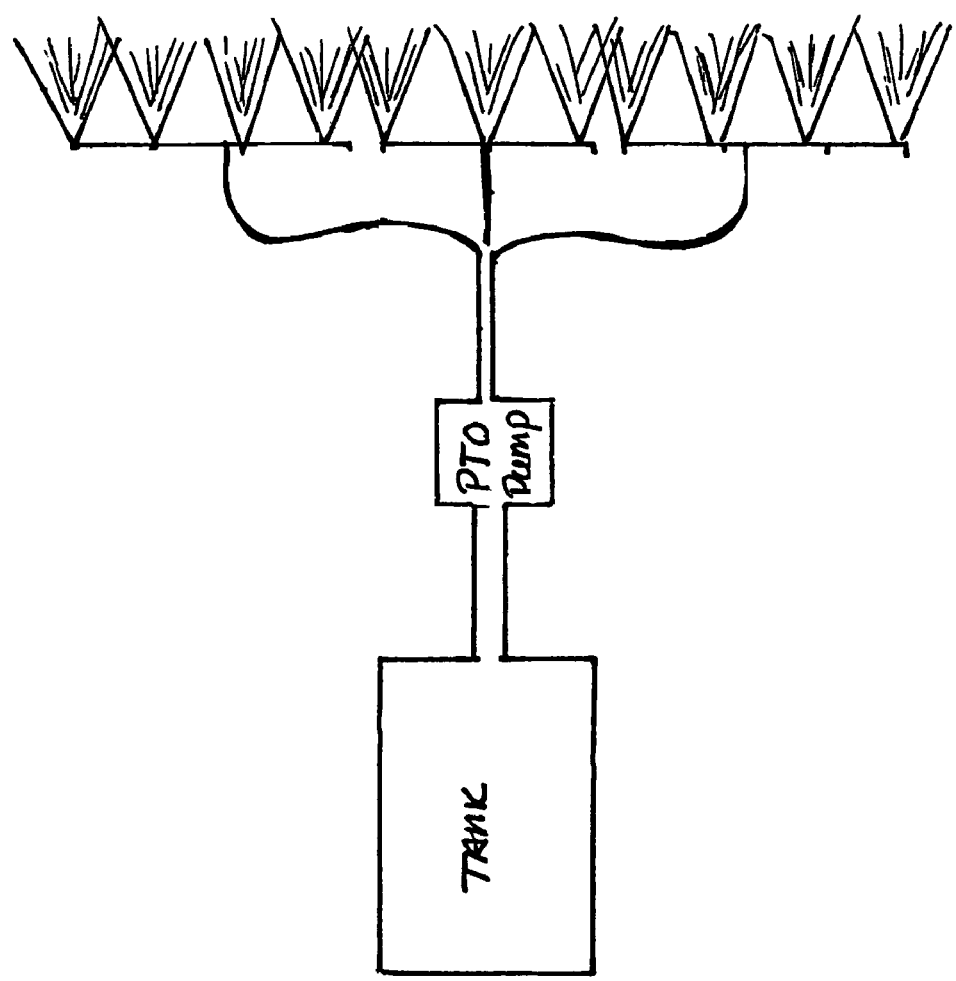
Figure 2:
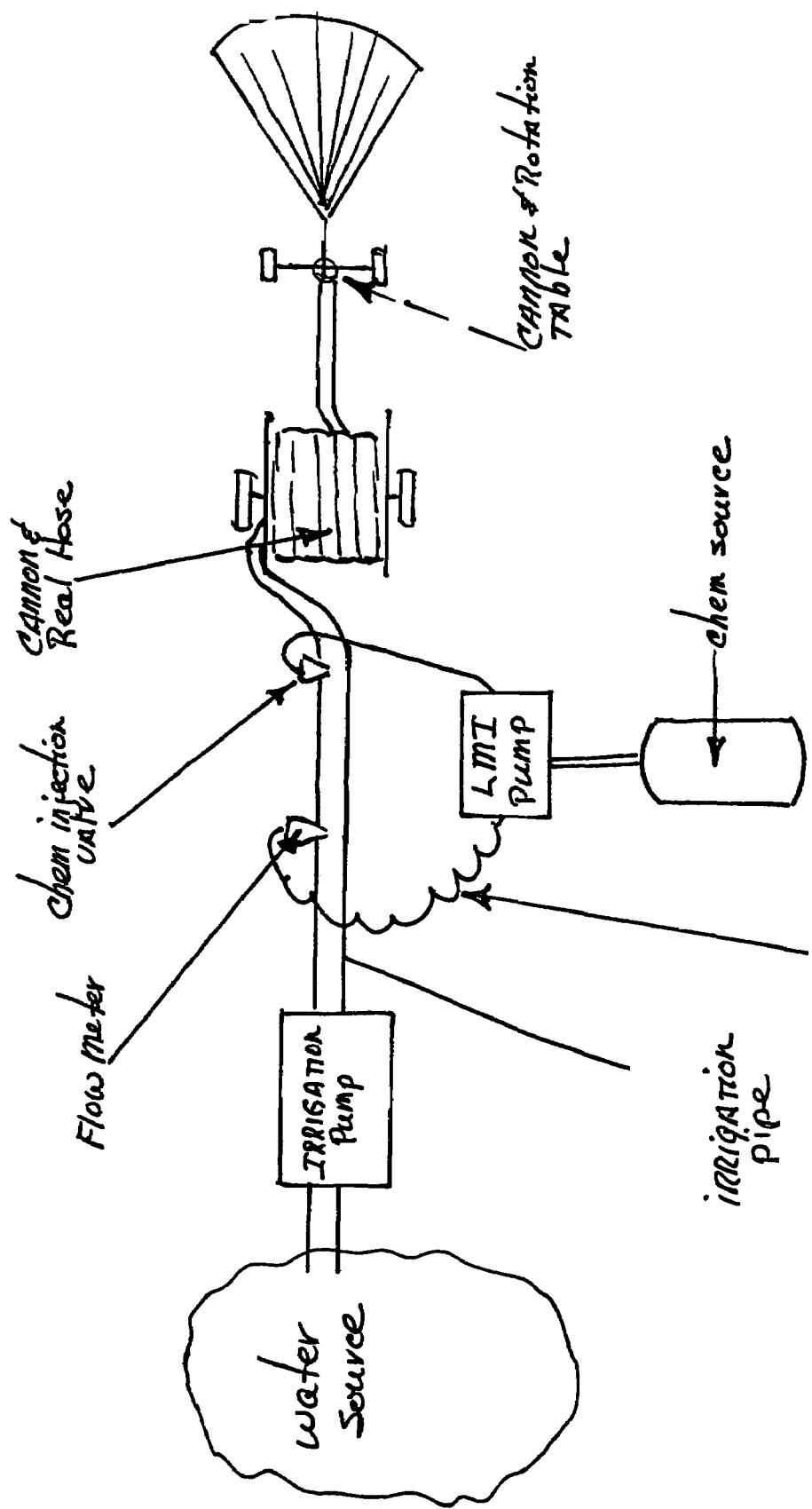

| | | | |
|---|---|---|---|
| 5,209,768 A * | 5/1993 | Hughes | 504/313 |
| 5,221,313 A * | 6/1993 | Mortvedt et al. | 71/63 |
| 5,242,248 A * | 9/1993 | Bramwell | 405/264 |
| 5,399,351 A * | 3/1995 | Leshchiner et al. | 424/422 |
| 5,405,905 A * | 4/1995 | Darr | 524/420 |
| 5,425,504 A | 6/1995 | Patterson | |
| 5,529,975 A * | 6/1996 | Chamberlain | 504/116 |
| 5,559,754 A | 9/1996 | Carnaggio et al. | |
| 5,632,799 A * | 5/1997 | Behel, Jr. et al. | 71/63 |
| 5,649,495 A * | 7/1997 | Salestrom | 111/132 |
| 5,670,567 A * | 9/1997 | Lahalih | 524/404 |
| 5,741,090 A * | 4/1998 | Dunning et al. | 405/263 |
| 5,814,123 A * | 9/1998 | Hansen | 71/11 |
| 5,815,465 A | 9/1998 | Turgut | |
| 5,837,029 A * | 11/1998 | Behel, Jr. et al. | 71/63 |
| 5,849,862 A * | 12/1998 | Davies et al. | 528/502 E |
| 5,863,789 A * | 1/1999 | Komatsu et al. | 435/262 |
| 5,865,379 A | 2/1999 | Dahl | |
| 5,865,869 A * | 2/1999 | Hansen | 71/11 |
| 5,868,087 A * | 2/1999 | Salestrom | 111/132 |
| 5,881,919 A | 3/1999 | Womac et al. | |
| 6,132,968 A * | 10/2000 | Le et al. | 435/6 |
| 6,395,051 B1 * | 5/2002 | Arnold et al. | 71/27 |

\* cited by examiner

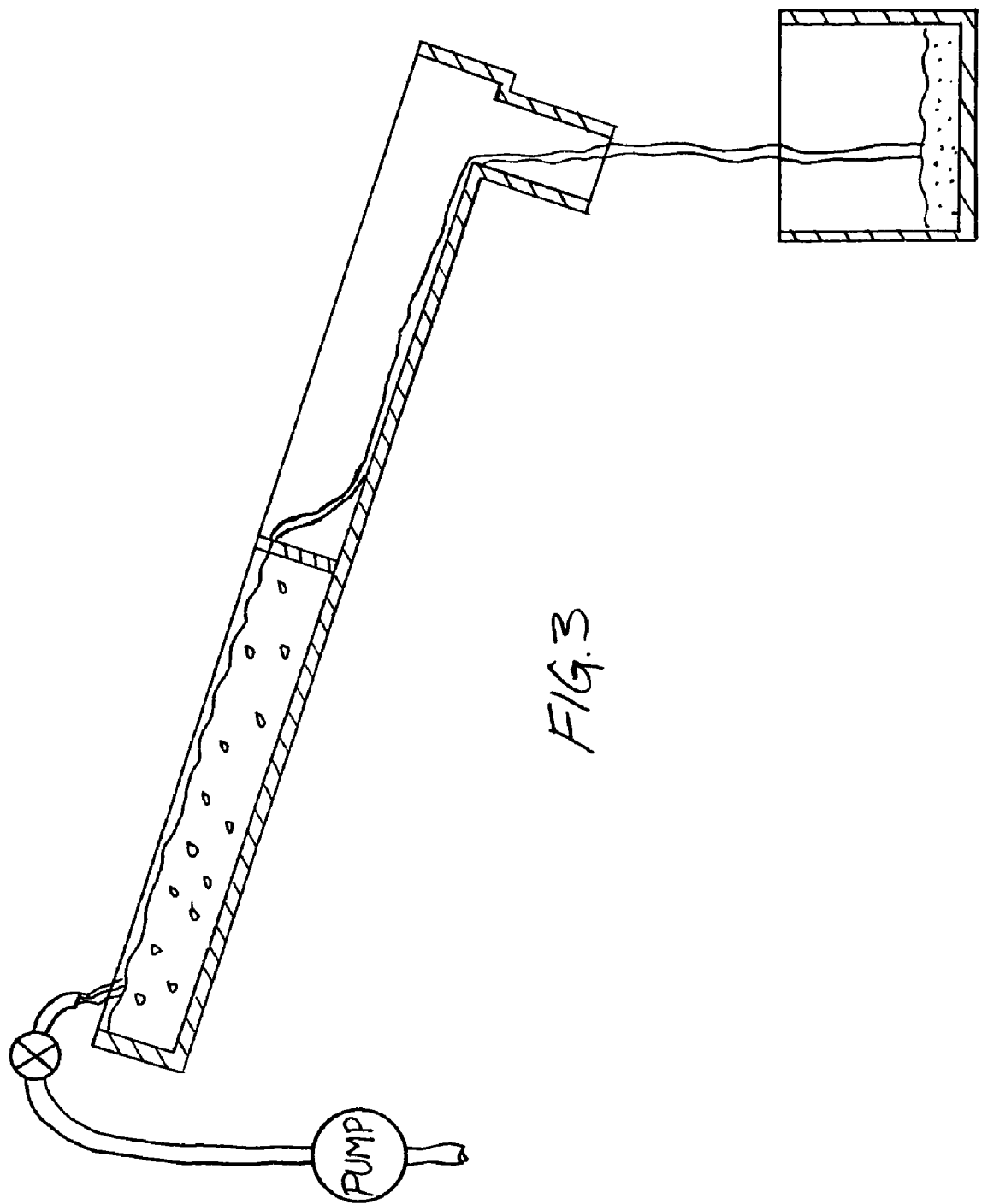

US 7,850,401 B1

METHOD FOR STABILIZING SOIL AGAINST EROSION

BACKGROUND OF THE INVENTION

1. Field of the Invention

The present invention relates to soil stabilization methods and more particularly pertains to a new method of stabilizing soil for providing an effective and predictable method for stabilizing large areas of soil having sections of soil of various compositions and slopes.

2. Description of the Prior Art

Large land contouring projects, such as, for example, golf course construction, typically involve the formation of a variety of land features or contours that are desirable for lending the golf course a distinctive character and making golf play more challenging. However, desirable land contours often produce a wide variation of slopes and curves which especially vulnerable to erosion, many times at varying erosion rates. Further, the wide land area typically encompassed by a project such as a golf course means that a wide variety of soil types and compositions may be encountered, and these varying soils will often exhibit different tendencies for erosion. While erosion control is very important during the soil placement and grading operations, it is critically important from the time that grading of the soil is finished until the time at which the turf is sufficiently established, such as, the time at which golf play may occur on the turf without damaging the turf. Thus, successful soil stabilization against erosion requires stabilization of the soil through the time that the turf is firmly established on the golf course and the turf is ready to be played on by golfers.

The possibility of erosion prior to turf establishment, and the relatively high cost of preventing such erosion until final turf establishment, is believed to have limited the extent of sloped areas of the contouring of golf courses, and the relative steepness of those sloped areas of golf courses heretofore designed and constructed. However, it is known that at least some golf course designers desire to exceed conventional contouring limitations and want to employ golf course contouring that exceeds conventional limitations on the steepness of sloped land areas and on the length of sloped land areas for enhancing the distinctiveness and difficulty of play the golf courses.

The use of various soil stabilization methods is known in the prior art. A highly popular approach to stabilizing soil during the turf grow-in period is to employ mats of fibrous grids laid out on the surface of the soil to hinder movement of the soil during rain showers and watering of the prepared surface of the soil. However, it has been found that erosion can still occur below the matting. Further, the cost of the matting is exceedingly expensive, especially in the quantities required to cover all of the areas typically needed to be stabilized against erosion on a typical golf course project, and the matting requires extensive labor to install. Although the matting is intended to eventually degrade into the soil over time, the matting is normally removed from the surface of the soil before the turf becomes fully established because of the belief that leaving the matting in place tends to slow or stifle turf growth.

Polyacrylamide, or "PAM", has been known to be effective as a soil stabilizer, and insofar as is known, has been used on agricultural land in various manners. Amending soil with PAM has been shown to bond soil particles together, and also to facilitate the growth of vegetation in the soil by enhancing the root structure of the vegetation, by enhancing germination, by enhancing water retention, and by enhancing nutrient retention.

However, the use of PAM to amend soil in practical applications has been spotty, as the use of the PAM polymer has been very problematic. For example, use of too much of the polymer (at application rates of about 300 to 400 pounds per acre) can produce a hard crust on the top of the soil that actually hinders vegetation growth, and is expensive. Some agricultural use is known by injecting the PAM polymer directly into the water supply to irrigation systems in amounts of about one-half to one gallon per acre for spreading the PAM in a single uniform amount over an entire field of relatively level agricultural soil. The use of the PAM at these application rates has relatively little effect for holding the soil in place against any significant erosion forces, but is considered "safe" in that handling problems generally associated with the polymer are not encountered at these low application rates.

Another problem associated with PAM is that the polymer is exceedingly difficult to handle and use in the field, as the behavior of PAM in the presence of water can be extremely sensitive and unpredictable. For example, if the polymer is mixed with water in the wrong manner, such as too quickly or in too great amounts, the polymer (and the mixture with water) can easily become so highly viscous that mixing and application equipment can become clogged and unusable. On newly placed soil, especially where little or no compaction has occurred, the application of a PAM and water mixture to the soil can even precipitate erosion of the soil by the application process, especially on soil with a top surface having anything more than a minimal slope.

The method for stabilizing soil against erosion according to the present invention substantially departs from the conventional concepts and designs of the prior art, and in so doing provides an effective and predictable method for stabilizing large areas of soil of varying compositions and slopes.

SUMMARY OF THE INVENTION

In view of the foregoing disadvantages inherent in the known types of soil stabilization methods now present in the prior art, the present invention provides a new method for stabilizing soil against erosion wherein the same can be utilized for providing an effective and predictable method for stabilizing large areas of soil having sections of soil of various compositions and slopes.

To attain this, the present invention generally comprises a method of applying polyacrylamide (PAM) for stabilizing particles of soil of a land area from movement about the land area. The general slope of the top surface of the soil is measured, and a tentative application rate for the land area is established by categorizing the general slope of the top surface of the land area. The degree of stability of the soil of the land area to be treated is determined by placing a sample of the soil in a tray and pouring a liquid (comprising water or a mixture of water and PAM) over the sample and evaluating the erosion potential of the soil by measuring any movement of the soil in the tray. The tentative application rate may be adjusted based upon the results of the testing of the erodability of the soil samples, such as by increasing the tentative application rate if testing of the soil sample showed a relatively higher vulnerability to erosion. An application rate is calculated for applying a mixture of PAM and water to the land area.

The mixture is misted onto the surface of the land area to produce a tack coat for initially stabilizing topmost soil particles on the top surface of the land area against soil movement caused by subsequent mixture applications. The application of the mist of the mixture is continued until the top surface of the soil of the land area becomes saturated. A time period is waited which is greater than the time required for any puddles of the mixture on the surface of the soil to be absorbed into the soil, and less than the time required before the top surface of the soil dries. A spray of the mixture is directed onto the surface of the soil of the land area from at least four directions, and at a substantially perpendicular angle downward onto the surface of the soil of the land area. The extent of penetration of the mixture below the top surface of the soil of the land area is tested for determining whether further polymer application is necessary. Once the desired penetration of the PAM into the soil is established, the application of the mixture may be discontinued.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one aspect of the practice of the invention in detail, it is to be understood that the invention is not limited in its application to the specific details of the steps and acts set forth in the following description. The invention is capable of being practiced in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other methods and practices for carrying out the several purposes of the present invention. It is important, therefore, that the claims be regarded as including such equivalent methods insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying descriptive matter.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic diagram of an illustrative spraying system for use in practicing the new method for stabilizing soil against erosion according to the present invention.

FIG. 2 is a schematic diagram of another illustrative spraying system for use in practicing the new method for stabilizing soil against erosion according to the present invention.

FIG. 3 is a schematic side sectional view of a soil sample testing apparatus for evaluating the vulnerability of a sample of a particular soil to erosion.

DESCRIPTION OF THE PREFERRED EMBODIMENT

With reference now to the drawings, and in particular to FIGS. 1 through 3 thereof, a new method for stabilizing soil against erosion embodying the principles and concepts of the present invention will be described.

Generally, the invention comprises a process for evaluating the vulnerability to erosion of a land area and the soil of the land area, and amending the soil with polyacrylamide, or "PAM", a polymer capable of bonding to soil particles to create groups or "strings" of soil particles that are resistant to being moved by wind and water (such as from precipitation or periodic turf watering).

A highly suitable form of PAM for use in the invention is in an emulsion form. An example of a highly preferred PAM emulsion is an anionic acrylamide copolymer emulsion in hydrocarbon oil, such as is available under the tradename "EARTHBOUND™" from Earth Chem of Fort Collins, Colo. The most preferable forms of the polymer are believed to have a very high molecular weight. Significantly, the anionic PAM is attracted to positively charged soil particles, and may form chains of substantial length and binding to large numbers of soil particles when brought into contact with the soil particles.

A land area to be treated is covered by a layer of soil particles that may extend to various depths below the upper surface of the land area. The invention is highly suitable for use on land areas where the soil has been recently moved or positioned, such as, for example, a golf course during or just after the final contour grading preparations, and before any significant turf growth has been established, although application with even a significant amount of turf growth is possible and useful. It is at the time before turf establishment that the soil of the land area is most vulnerable to erosion by wind and precipitation, and also is the time when the soil is being subjected to extensive watering for establishing turf on the land area. It should be noted that the land area, as referred to herein, may comprise an area of a few square yards, such as in the case of a putting green, up to several acres, such as in the case of fairways or fairway boundary areas. A particular land area for the purpose of PAM treatment using the invention is generally defined by a number of factors, such as, for example, the type or composition of the soil, and the average or general slope of the top surface of the soil. A large area, such as a golf course, may be subdivided into several smaller sections of land area.

One of the preliminary steps of stabilizing the soil of the land area is to determine the degree of stability of the soil of the land area to be treated for the purpose of determining the relative amount of a mixture of water and PAM to be applied to the land area. One of the factors to be considered in determining the stability of the soil of the land area is the general or average or predominant slope of the top surface of the particular land area to be treated. Thus, the general slope of the top surface of the soil may be measured or approximately estimated. Generally, the invention is highly suitable for slopes ranging from generally level (e.g., no slope) to slopes of approximately one to one, although slopes greater than one to one have successfully been treated according to the invention. In such highly sloped areas, the invention also may be practiced in combination with other soil stabilization techniques, such as, for example, matting.

Preferably, the general slope of the land area is categorized in one of the following categories: a substantially level slope, a slope of about 10 to 1 (e.g., one foot of vertical rise for every 10 feet of horizontal run, or a slope of about 5 degrees), a slope of about 6 to 1 (e.g., one foot of vertical rise for every 6 feet of horizontal run, or a slope of about 9 degrees), a slope of about 4 to 1 (e.g., one foot of vertical rise for every 4 feet of horizontal run, or a slope of about 14 degrees), a slope of about 3 to 1 (e.g., one foot of vertical rise for every 3 feet of horizontal run, or a slope of about 18 degrees), a slope of about 2 to 1 (e.g., one foot of vertical rise for every 2 feet of horizontal run, or a slope of about 26 degrees), a slope of about 1.5 to 1 (e.g., one foot of vertical rise for every 1.5 feet of horizontal run, or a slope of about 33 degrees), or a slope of about 1 to 1 (e.g., one foot of vertical rise for every 1 foot of horizontal run, or a slope of about 45 degrees) or steeper.

Another factor for determining the degree of stability of the soil is the vulnerability of the particular soil of the land area to erosion. The practice of the invention may include testing of the soil of the land area for its vulnerability to erosion. As a part of the testing process, a sample of the soil from the land area to be treated is removed from the land area, such as by removing one or more core samples from the land area. A core soil sample is readily obtained by boring into the ground with core sampling equipment, or even a golf cup or hole cutter.

For the testing of the soil sample, the soil sample may be divided into two samples so that a comparative testing may be accomplished. A first tray and a second tray are provided for testing the soil samples. Each of the first and second trays is preferably elongate, and has a length that is divided into two sections or portions that are separated by a wall. The wall may be provided with a generally vertically-oriented notch or slot therein for permitting liquid to pass therethrough.

A first portion of the soil sample is placed in the first tray and a second portion of the soil sample is placed in the second tray.

The first and second trays are tilted to produce a slope in the surface of the sample contained in each tray. The tilted elongate trays have an uppermost end and a lowermost end, and each of the trays thus has an upper portion and a lower portion. The soil samples are placed in the upper portion of each of the respective first and second trays. Preferably, the tilt of the first and second trays is such that the tilt of the bottom wall of the tray is about 3 to 1, and as a result, the upper surface of the soil sample in the tray is also about 3 to 1.

A liquid is introduced into each of the first and second trays. A first liquid is introduced into the uppermost end of the first tray, and a second liquid is introduced into the uppermost end of the second tray. The first liquid comprises water, preferably without any significant levels of other substances. The second liquid comprises a mixture of PAM and water. The mixture of the second liquid preferably comprises about 1000 parts water to about 1 part PAM, which generally corresponds to the mixture preferably applied to soil having a general slope of about 3 to 1.

The first liquid is poured on the soil sample in the first tray near the uppermost end of the first tray. The second liquid is poured on the soil sample in the second tray near the uppermost end of the second tray. The first liquid and the second liquid may be applied on the soil samples at an initial rate, which preferably comprises a rate of approximately $\frac{1}{10}$ to $\frac{1}{20}$ inches per hour, and which approximates a drizzling rain falling on the surface of the soil sample. The liquids may be applied to the soil samples at the initial rate at least until the liquid has penetrated the surface of the soil samples about one-quarter to one-third inch below the top surface of the samples.

The rate of application of the first and second liquids to the first and second soil samples is increased from the initial rate by an increment after a period of time. The increment of increase in the rate of application is preferably about one-half inch per hour. The period of time between successive increases may be about five minutes. The rate of application is increased by the increment until the rate of application reaches at least the rate of about 2 inches per hour.

A first container, or sediment trap, is placed below the lowermost end of the first tray to catch and collect liquid flowing or draining from the lowermost end of the first tray. A second container, or sediment trap, is placed below the lowermost end of the second tray to catch and collect liquid flowing or draining from the lowermost end of the second tray.

The erosion potential of the soil of the land area is evaluated by measuring any movement of sediment particles of soil in the samples in the first and second trays. The evaluation of the movement of sediment particles includes viewing the appearance of the contents of the lower portion of the first tray and the first container, and checking the lower portion of the first tray and the first container for soil carried by the first liquid out of the upper portion of the first tray.

The appearance of the contents of the lower portion of the first tray and of the first container is categorized based upon a predetermined system or chart for rating the relative erodability of the soil.

If the contents of the lower portion and the first container is liquid that is substantially clear of soil particles, the soil is categorized as being generally not appreciably erodible. If the contents of the lower portion and the first container is liquid that is nearly clear of soil particles, the soil is categorized as being generally slightly erodible. If the contents of the lower portion and the first container is liquid that is cloudy with soil particles, the soil is categorized as being generally moderately erodible. If a noticeable amount of the soil has been carried from the upper portion to the lower portion of the first tray, and the contents of the lower portion and the first container is liquid that is very silty with soil particles, the soil is categorized as being generally easily erodible. If the soil moves quickly from the upper portion to the lower portion of the first tray, and the first contents of the first tray and the first container is muddy in appearance, the soil is categorized as being generally very erodible.

When substantially instant erosion of soil occurs from the upper portion to the lower portion of the first tray, and the contents of the lower portion and of the first container may be characterized as nearly a slurry, the soil is categorized as being generally difficult to control.

The movement of soil particles in the second tray may be used for comparison to the movement of soil particles in the first tray. As the second liquid comprises a mixture of water and PAM, the movement (or lack of movement) of soil particles in the second tray gives an indication of the likely effectiveness of the mixture for limiting erosion of the soil particles on the land area.

A tentative application rate is established for the land area by categorizing the general slope of the top surface of the land area. If the general slope of the top surface of the soil is substantially level, a first category tentative application rate is assigned. One preferred first category tentative application rate is about 1 gallon of PAM per acre treated. If the general slope of the top surface of the soil is about 10 to 1, a second category tentative application rate is assigned. One preferred second category tentative application rate is about 1.5 gallons of PAM per acre treated. If the general slope of the top surface of the soil is about 6 to 1, a third category tentative application rate is assigned. One preferred third category tentative application rate is about 2 gallons of PAM per acre treated. If the general slope of the top surface of the soil is about 4 to 1, a fourth category tentative application rate is assigned. One preferred fourth category tentative application rate is about 3 gallons of PAM per acre treated. If the general slope of the top surface of the soil is about 3 to 1, a fifth category tentative application rate is assigned. One preferred fifth category tentative application rate is about 4 gallons of PAM per acre treated. If the general slope of the top surface of the soil is about 2 to 1, a sixth category tentative application rate is assigned. One preferred sixth category tentative application rate is about 6 gallons of PAM per acre treated. If the general slope of the top surface of the soil is about 1.5 to 1, a seventh category tentative application rate is assigned. One preferred seventh category tentative application rate is about 8 gallons of PAM per acre treated. If the general slope of the top surface of the soil is about 1 to 1 or steeper, an eighth category tentative application rate is assigned. One preferred eighth category tentative application rate may be about 8 gallons of PAM per acre treated. For general slopes greater or steeper than 1 to 1, other stabilization techniques or devices may optionally be employed in combination with the PAM soil treatment according to the invention.

The tentative application rate based on the general slope of the top surface of the soil is adjusted based upon the results of the testing of the erodability of the soil to arrive at a final or total application rate for the land area. Significantly, if testing of the soil samples demonstrated a relatively higher vulnerability to erosion, the tentative application rate based on the general slope is increased to reflect the higher vulnerability of the soil to erosion. If the character of the soil sample was determined to be moderately erodible, the tentative application rate is increased by one slope category to determine the total application rate. If the character of the soil sample was determined to be easily erodible, the tentative application rate is increased by up to two slope categories to determine the total application rate. If the character of the soil sample was determined to be very erodible, the tentative application rate is increased by up to three slope categories to arrive at the total application rate. If the character of the soil sample was determined to be not controllable, the tentative application rate is increased by up to four slope categories to determine the total application rate.

A mixture formula is calculated for the mixture to be applied to the land between area. Preferably, the mixture has a ratio of one part PAM to about 500 parts to about 5000 parts water by volume for application without equipment damage or applying so much liquid that erosion is initiated. Highly preferably, the mixture has a ratio of about 1 part PAM to between about 900 parts to 1100 parts water by volume for enabling application that avoids any significant possibility of application equipment difficulties while using the most economical quantities of water. Ideally, the mixture has a ratio of about 1 part PAM to about 1000 parts water by volume for enabling the safest (to equipment) application while minimizing the quantities of mixture to be applied to the land area (and the time involved).

A significant aspect of the application aspect of the invention is the use of a number of applications at a uniform mixture composition to the soil, rather than applying the entire quantity of mixture to achieve the desired amount of PAM in a single application. Preferably, a uniform mixture composition is used of approximately 1 part PAM to 1000 parts water (by volume), and the application rate is increased by making multiple applications to the soil of the land area. It has been found that the 1 to 1000 mixture ratio is highly suitable for use when a uniform mixture composition is used to achieve the desired application rate, and this mixture ratio is easily handled with respect to preparing the PAM and water mixture for application, and keeping the number of applications practical during the actual application process.

It has been found that the relative compaction of the soil of the land area may be considered in determining the total number of applications of the uniform mixture. The number of applications of the uniform mixture may be increased if the top surface of the soil of the land area is determined to have a compacted crust. In the event of a compacted crust, a preliminarily misting of the mixture onto the top surface of the soil is highly beneficial to loosen the compaction of the soil for enhancing the penetration and flocculation of subsequent applications of the mixture into the soil. Thus, the initial misting of the mixture on the top surface of the soil tends to loosen the crust for permitting faster and easier penetration of the subsequent applications of the mixture into the soil.

The PAM polymer is mixed with water to form a mixture for application to a land area. The particular procedure used in mixing the PAM and water may be important in that use of an improper procedure can cause the PAM to take on a gel form that resists mixing with the water and gums up and clogs mixing and spraying equipment.

Optionally, a bulk quantity batch of the mixture may be mixed using a first volume of water and a second volume of PAM.

Preferably, the entire first volume of water is agitated to a high swirl agitation, and the second volume of PAM is poured or injected into the agitated water at a rate of less than approximately one quart of PAM per minute to ensure proper mixing of the PAM with the water so that the PAM does not form a gelatinous mass that does not disperse in the water. The agitation of the mixture should be continued for at least approximately five minutes after the entire amount of PAM has been added to the water and before the mixture is applied to soil.

Bulk quantity batches may be applied by hand held or vehicle mounted spraying apparatus. Surprisingly, a highly suitable spraying apparatus is an apparatus that is typically used for spray application of seed, mulch, fertilizer and water mixtures to soil for establishing turf. One such apparatus is a FINN HYDROSEEDER Model T-90-T-II available from the Finn Corporation of Cincinnati, Ohio. The spraying apparatus may also include a directional nozzle or "cannon" mounted on a raised level on a vehicle. Optionally, the bulk quantity batch may be sprayed using chemical spraying equipment, such as a vehicle with a cantilevered boom spray bar. The equipment should be suitable, or adapted, for handling high viscosity liquids.

Optionally, the PAM polymer may be continuously injected into a flow of water at a rate adapted to achieve a desired mixture ratio between water and PAM. This type of continuous mixing may be employed when the mixture is to be applied to the soil surface using a central spray source. Significantly, a central spray source such as a water cannon apparatus, which is typically used for applying relatively pure water to turf, may be employed to apply the mixture to the top surface of the soil through the continuous mixing. The use of the water cannon is especially useful for applying the mixture to relatively large land areas. One highly suitable water cannon is the RAINBOY model available from BAUER of Austria.

As a significant initial step of the mixture application process, the mixture is lightly misted onto the top surface of the soil of the land area to produce a "tack coat" for initially stabilizing the soil particles on the land area against soil movement caused by subsequent mixture applications. The misting of the mixture onto the top surface is highly important, especially when the preliminary evaluation of the soil of the land area has indicated that the soil is highly erodible, and may even be susceptible to being eroded by the spray application of the PAM and water mixture. The mist applied to the soil in this initial step may be a highly diffuse spray of small droplets that is directed into the air above the top surface of the soil. The mist is preferably very fine, and misting in many cases may not be satisfactorily performed (for uniform application) in any significant wind (e.g., above about 15 miles per hour) because the mist is moved onto other land areas.

The spray application of the mist of the mixture to the surface of the soil is continued until the top surface of the soil of the land area becomes saturated with the mixture. The application of the mixture is stopped when the mixture appears to be accumulating on the top surface of the soil rather than the mixture being relatively quickly absorbed into the ground. A highly suitable indicator that the mixture is accumulating on the top surface, and not being readily absorbed into the soil, is that the top surface of the soil begins to reflect light and appears shiny. The application of the mixture may also be terminated if movement of the mixture is observed on the top surface of the soil.

After the misting spray application, a time period is allowed to pass so that the mixture is able to penetrate the ground below the top surface. The time period may vary based upon the particular characteristics of the soil, but is generally the time period required for any significant puddling of the mixture on the surface of the soil to be absorbed into the soil. However, and significantly, the time period should be less than the time required for the mixture to dry from the top surface of the soil so that the moisture of the applied mixture permits subsequent applications to more quickly penetrate the top surface and enter the soil to deeper levels. If the soil surface becomes dry, the initial misting should be repeated to rewet the top surface.

If further applications are required to achieve total or desired application rate for the soil, a subsequent application of the mixture is applied to the surface of the soil of the land area. The application of the mixture to the top surface is repeated for an appropriate number of times until the application rate for the soil of the land area is achieved. The application of the mixture to the surface of the soil may be repeated up to approximately 15 times.

The application of the mixture to the soil preferably includes directing a spray of the mixture onto the surface of the soil of the land area from at least four directions for ensuring an even application to the top surface. This step is especially important for ensuring that highly contoured land areas, such as those frequently encountered on golf courses, receive a uniform application of the mixture for the most uniform stabilization effect. Since the relatively higher side of a contour is the most exposed to the effects of precipitation and watering, the higher side must be covered as well as the low side of the contour. Preferably, each of the directions of spray is oriented at about 90 degrees to at least two of the other directions to obtain the best coverage.

A spray of the mixture may be directed downwardly onto the surface of the soil of the land area at an angle substantially perpendicular to the top surface of the soil. Preferably, the direction of the substantially perpendicular spray varies less than about 15 degrees from an axis oriented perpendicular to the top surface of the soil. The downward spray provides further assurance of uniform coverage of the top surface of the soil.

After an application of the mixture, the extent of penetration of the mixture, or more importantly the penetration of the PAM polymer of the mixture, below the top surface of the soil of the land area is tested by examining the soil below the top surface of the soil, such as by, for example, by removing a core sample of the soil from the land area. For most effective stabilization, the application of the mixture is preferably continued until the PAM polymer reaches sufficient depth penetration. For example, for slope categories between substantially level and 4 to 1, inclusive, sufficient depth penetration may be a minimum of about 1.3 inches. For general slopes of about 3 to 1, sufficient depth penetration may be a minimum of about 1.5 inches. For general slopes of about 2 to 1, sufficient depth penetration may be a minimum of about 2 inches. For general slopes of about 1.5 to 1, sufficient depth penetration may be a minimum of about 2.5 inches. For general slopes of about 1 to 1 or steeper, sufficient depth penetration may be a minimum of about 3 inches.

The aforedescribed desirable depth penetrations are most often achievable with total application rates, calculated by the aforedescribed consideration of the slope and soil character. However, if the desired soil penetration has not been achieved through the application of the entire amount corresponding to the total application rate, the application of the mixture should be continued until the desired soil penetration is achieved. If the desired depth penetration is achieved before the entire amount of mixture is applied to achieve the total application rate, the application of mixture may be preferably continued until the total application rate is achieved. Thus, the application of the mixture to the land area is most preferably continued until both the total application rate is achieved and the desired soil penetration depth is achieved.

The extent of penetration of the PAM polymer in the soil may be detected by observing the depth of the formation of "strings" of the PAM polymer and soil which often characterizes the portion of the soil that the PAM polymer has penetrated.

Optionally, a concluding or final application of the mixture to achieve the desired application rate may be performed by injecting the PAM polymer directly into a water sprinkling system installed in the ground of the golf course and intended for watering turf growing on the course. This last application of the number of times at the uniform application rate is permissible because earlier applications have immobilized the soil of the areas of higher slope categories.

An optional method of applying PAM to the soil of a land area includes applying a granular form of the PAM polymer to the soil. The application of granular PAM is most suitable for land areas where the top surface has a slope of about 2 to 1 or less. Initially, a liquid mixture of water and PAM is misted onto the top surface of the land area to produce a tack coat of the mixture for initially stabilizing the soil particles on the top surface of the land area against soil movement caused by subsequent applications of the granular PAM and the equipment used to distribute the granular PAM.

After the initial tack coat of the mixture is applied, a quantity of a dry granular form of PAM is substantially evenly distributed on the surface of the soil of the land area. The application rate of the granular PAM is preferably determined based upon the general slope of the top surface of the land area. If the general slope of the top surface of the soil is substantially level, a first category tentative application rate of about 4 pounds of granulated PAM per acre is assigned. If the general slope of the top surface of the soil is about 10 to 1, a second category tentative application rate of about 5 pounds of granulated PAM per acre is assigned. If the general slope of the top surface of the soil is about 6 to 1, a third category tentative application rate of about 6 pounds of granulated PAM per acre is assigned. If the general slope of the top surface of the soil is about 4 to 1, a fourth category tentative application rate of about 9 pounds of granulated PAM per acre is assigned. If the general slope of the top surface of the soil is about 3 to 1, a fifth category tentative application rate of about 12 pounds of granulated PAM per acre is assigned. If the general slope of the top surface of the soil is about 2 to 1, a sixth category tentative application rate of about 18 pounds of granulated PAM per acre is assigned. If the general slope of the top surface of the soil is about 1.5 to 1, a seventh category tentative application rate of about 21 pound of granulated PAM per acre is assigned. If the general slope of the top surface of the soil is about 1 to 1, an eighth category tentative application rate of about 24 pounds of granulated PAM per acre is assigned. After the granular PAM has been applied at the desired rate, a final application of the liquid mixture of water and PAM is applied to the soil.

A highly significant aspect of the invention is that on land areas having more than a minimal slope, the mixture is not applied to the soil in a single application, but in a series of two or more applications. The use of a series of applications is especially important when the mixture is being applied to soil in the relatively large volume quantities employed in the present invention. As the slope of the soil of the land area to be stabilized increases, the present invention increases the amount of the mixture that is to be applied to the soil, and the possibility of initiating destructive erosion during the application to the soil also increases. The application of the mixture in a series of applications, especially misting applications, minimizes the possibility of the application process initiating erosion.

The techniques of the invention have been highly suitable for stabilizing soil with a top surface with slopes up to and even exceeding 1 to 1 slopes. Not only have such severe slopes been successfully stabilized over the grow in period for turf, but the length of such contours has been significantly extended over what was previously attempted and successfully stabilized. Contours with slopes of approximately 1 to 1, and extending approximately 200 feet in length or more, have been successfully stabilized by the techniques of the invention. Stabilization of contours of such severity and extensiveness is not even believed to be practically possible with conventional matting stabilization techniques.

Although the invention has primarily been described in the context of golf course constructions, the techniques described can be easily adapted to other situations where the stabilization of soil is desired. As should be evident from the foregoing, the invention is especially useful where steep slopes are employed as a part of the land contouring, such as, for example, for road ditches and for landscaping berms.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of applying polyacrylamide (PAM) for stabilizing soil particles of a land area from erosive movement about the land area, the method comprising:
    establishing a uniform mixture ratio for a mixture of PAM and water to be applied to a land area;
    calculating a total application rate for applying the mixture to the land area;
    mixing PAM with water according to the uniform mixture ratio to form a mixture for application to the land area;
    applying the mixture to a top surface of soil of the land area; and
    terminating the application of the mixture when PAM reaches sufficient depth penetration below a top surface of the soil.

2. The method of claim 1 wherein the establishing step includes mixing PAM and water in a ratio of about 1 part PAM to between about 500 and about 5000 parts water by volume.

3. The method of claim 1 wherein the establishing step includes mixing PAM and water in a ratio of 1 part PAM to about 1000 parts water by volume.

4. The method of claim 1 additionally comprising the step of determining a number of times that the mixture of the uniform mixture ratio needs to be applied to the land area to achieve the calculated total application rate of the PAM.

5. The method of claim 1 wherein the applying step comprises making a series of applications of the mixture to the surface for a number of times until the application rate for the soil of the land area is achieved.

6. The method of claim 1 wherein the applying step includes misting a portion of the total application rate of the mixture onto the surface of the land area to produce a tack coat for initially stabilizing topmost soil particles on the top surface of the land area against soil particle movement caused by subsequent mixture applications.

7. The method of claim 1 wherein the applying step includes continuing to apply the mixture to the surface of the soil until the soil of the land area becomes saturated and stopping the application of the mixture top surface becomes saturated.

8. The method of claim 7 additionally comprising detecting saturation of the soil when the mixture accumulates on the surface rather than being absorbed into the ground and the mixture on the top surface reflects ambient light.

9. The method of claim 8 wherein the applying step includes waiting for a time period after detection of saturation such that the mixture is able to penetrate the ground below the surface, wherein the time period comprises the time required for any puddles of the mixture on the top surface of the soil to be absorbed into the soil below the top surface.

10. The method of claim 9 wherein the waiting step is conducted for a time period that is less than the time required for the top surface of the soil to dry.

11. The method of claim 1 wherein the applying step includes the step of directing a spray of the mixture onto the top surface of the soil of the land area from at least four directions, each of the directions being oriented at about 90 degrees to at least two of the other directions.

12. The method of claim 11 wherein the applying step includes the step of directing a spray of the mixture at a substantially perpendicular angle downward onto the top surface of the soil of the land area, wherein the direction of the substantially perpendicular spray varies less than about 15 degrees measured from an axis perpendicular to the surface of the soil.

13. The method of claim 1 additionally comprising testing the extent of penetration of the PAM below the top surface of the soil of the land area.

14. The method of claim 1 wherein the testing step includes removing a core sample of the soil from the land area.

15. The method of claim 1 additionally comprising the step of comparing the depth penetration of the PAM below the top surface of the soil of the land area to a set of minimum depth penetration values based upon the general slope of the land area to determine the minimum depth penetration needed for the land area being treated before terminating application of the mixture to the land area.

16. The method of claim 15 additionally comprising exceeding the total application rate calculated if the sufficient minimum depth penetration is not achieved through application of mixture to the soil at the total application rate.

17. The method of claim 1 wherein the establishing step includes mixing PAM and water in a ratio of about 1 part PAM to between about 500 and about 5000 parts water by volume;
  additionally comprising the step of determining a number of times that the mixture of the uniform mixture ratio needs to be applied to the land area to achieve the calculated total application rate of the PAM;
  wherein the applying step comprises making a series of applications of the mixture to the surface for a number of times until the application rate for the soil of the land area is achieved;
  wherein the applying step includes misting a portion of the total application rate of the mixture onto the surface of the land area to produce a tack coat for initially stabilizing topmost soil particles on the top surface of the land area against soil particle movement caused by subsequent mixture applications;
  wherein the applying step includes continuing to apply the mixture to the surface of the soil until the soil of the land area becomes saturated and stopping the application of the mixture top surface becomes saturated;
  additionally comprising detecting saturation of the soil when the mixture accumulates on the surface rather than being absorbed into the ground and the mixture on the top surface reflects ambient light;
  wherein the applying step includes waiting for a time period after detection of saturation such that the mixture is able to penetrate the ground below the surface, wherein the time period comprises the time required for any puddles of the mixture on the top surface of the soil to be absorbed into the soil below the top surface;
  wherein the waiting step is conducted for a time period that is less than the time required for the top surface of the soil to dry;
  wherein the applying step includes the step of directing a spray of the mixture onto the top surface of the soil of the land area from at least four directions, each of the directions being oriented at about 90 degrees to at least two of the other directions;
  wherein the applying step includes the step of directing a spray of the mixture at a substantially perpendicular angle downward onto the top surface of the soil of the land area;
  additionally comprising testing the extent of penetration of the PAM below the top surface of the soil of the land area;
  wherein the testing step includes removing a core sample of the soil from the land area;
  comparing the depth penetration of the PAM below the top surface of the soil of the land area to a set of minimum depth penetration values based upon the general slope of the land area to determine the minimum depth penetration needed for the land area being treated before terminating application of the mixture to the land area; and
  exceeding the total application rate calculated if the sufficient minimum depth penetration is not achieved through application of mixture to the soil at the total application rate.

18. The method of claim 1 additionally comprising determining the degree of stability of the soil of the land area to be treated including testing the vulnerability to erosion of the soil of the land area to be treated.

19. The method of claim 18 wherein the determining step includes removing a sample of the soil from the land area to be treated, pouring a first mixture of PAM on at least a first portion of the soil sample, and observing the soil sample for any movement of soil in the soil sample caused by the mixture.

20. The method of claim 19 additionally comprising positioning the soil sample so that an upper surface of the sample has a slope, wherein the pouring of the first mixture on the soil sample is performed near an uppermost end of the slope of the upper surface of the soil sample.

21. The method of claim 20 additionally comprising placing the soil sample in an elongated first tray, collecting in a first container the portion of the first liquid that drains from a lowermost end of the first tray and any soil particles carried by the portion of the first mixture, and categorizing the appearance of the first mixture and soil particles in the first container based upon a predetermined chart rating the erodability of the soil,
  wherein when the contents of the first container is clear, the soil is categorized as not erodible,
  wherein when the contents of the first container is nearly clear, the soil is categorized as slightly erodible,
  wherein when the contents of the first container is cloudy, the soil is categorized as moderately erodible,
  wherein when contents of the first container is very silty, the soil is categorized as easily erodible,
  wherein when contents of the first container is muddy in appearance, the soil is categorized as very erodible, and
  wherein when contents of the first container is nearly a slurry, the soil is categorized as difficult to control.

22. The method of claim 19 wherein the slope in the upper surface of the sample is approximately 3 to 1.

23. The method of claim 19 wherein the first mixture of PAM includes water.

24. The method of claim 19 wherein the determining step includes:
  providing a second tray;
  removing a sample of the soil from the land area to be treated and placing at least a second portion of the soil sample in the second tray;
  tilting the second tray to produce a slope in an upper surface of the second portion of the sample in the second tray that is substantially equal to the slope of the upper surface of the first portion of the sample in the first tray;
  pouring a second liquid on the soil sample in the second tray near an uppermost end of the second tray, the second liquid comprising water without PAM;

collecting in a second container the portion of the second liquid that drains from a lowermost end of the second tray and any soil particles carried by the portion of the second liquid, and comparing movement of soil particles from the second tray into the second container to movement of soil particles from the first tray into the first container.

25. The method of claim 1 further comprising:

after an initial application of the PAM and water mixture to the surface of the soil, applying a granular form of PAM to the soil.

26. A method of applying polyacrylamide (PAM) for stabilizing soil particles of a land area from erosive movement about the land area, the method comprising;

calculating a total application rate for applying a mixture of PAM and water to the land area based upon a uniform mixture ratio;

mixing PAM with water according to the uniform mixture ratio to form a mixture for application to the land area; and applying the mixture to a top surface of soil of the land area, the mixture being applied to the top surface of the land area as a mist so as to produce a tack coat of the PAM on the top surface of the soil to initially stabilize topmost soil particles on the top surface of the land area against soil particle movement caused by any subsequent mixture applications;

wherein the applying step comprises making a series of applications of the mixture to the soil to achieve the total application rate for the soil of the land area, and temporarily terminating application of the mixture to the soil between applications of the series of application when saturation of the soil by the mixture is detected.

27. The method of claim 26 additionally comprising the step of determining a number of times that the mixture of the uniform mixture ratio needs to be applied to the land area to achieve the calculated total application rate of the PAM.

28. The method of claim 26 wherein the applying step includes continuing to apply the mixture to the surface of the soil until the soil of the land area becomes saturated and stopping the application of the mixture top surface becomes saturated.

29. The method of claim 28 additionally comprising detecting saturation of the soil when the mixture accumulates on the surface rather than being absorbed into the ground and the mixture on the top surface reflects ambient light.

30. The method of claim 29 wherein the temporarily terminating application of the applying step includes waiting for a time period after detection of saturation such that the mixture is able to penetrate the ground below the surface, wherein the time period comprises the time required for any puddles of the mixture on the top surface of the soil to be absorbed into the soil below the top surface.

31. The method of claim 30 wherein the waiting step is conducted for a time period that is less than the time required for the top surface of the soil to dry.

32. The method of claim 26 wherein the applying step includes the step of directing a spray of the mixture onto the top surface of the soil of the land area from at least four directions, each of the directions being oriented at about 90 degrees to at least two of the other directions.

33. The method of claim 26 wherein the applying step includes the step of directing a spray of the mixture at a substantially perpendicular angle downward onto the top surface of the soil of the land area, wherein the direction of the substantially perpendicular spray varies less than about 15 degrees measured from an axis perpendicular to the surface of the soil.

34. The method of claim 26 additionally comprising testing the extent of penetration of the PAM below the top surface of the soil of the land area.

35. The method of claim 26 wherein the testing step includes removing a core sample of the soil from the land area.

36. The method of claim 26 additionally comprising the step of terminating the application of the mixture when PAM penetrates below a top surface of the soil.

37. The method of claim 36 additionally comprising comparing the depth penetration of the PAM below the top surface of the soil of the land area to a set of minimum depth penetration values based upon the general slope of the land area to determine the minimum depth penetration needed for the land area being treated before terminating application of the mixture to the land area.

38. The method of claim 26 additionally comprising establishing the uniform mixture ratio for a mixture of PAM and water to be applied to a land area;

wherein the establishing step includes mixing PAM and water in a ratio of about 1 part PAM to between about 500 and about 5000 parts water by volume.

39. The method of claim 26 additionally comprising the step of considering the relative compaction of the soil of the land area, and increasing a number of times of applications of the mixture if the top surface of the soil of the land area has a compacted crust for loosening the compaction of the soil to enhance the penetration of subsequent applications of the mixture into the soil.

40. The method of claim 26 additionally comprising the step of determining a number of times that the mixture of the uniform mixture ratio needs to be applied to the land area to achieve the calculated total application rate of the PAM;

wherein the applying step comprises making a series of applications of the mixture to the soil according to the number of times determined to achieve the total application rate for the soil of the land area;

wherein the applying step includes continuing to apply the mixture to the surface of the soil until the soil of the land area becomes saturated and stopping the application of the mixture top surface becomes saturated;

additionally comprising detecting saturation of the soil when the mixture accumulates on the surface rather than being absorbed into the ground and the mixture on the top surface reflects ambient light;

wherein the applying step includes the step of directing a spray of the mixture onto the top surface of the soil of the land area from at least four directions;

wherein the applying step includes waiting for a time period after detection of saturation such that the mixture is able to penetrate the ground below the surface, wherein the time period comprises the time required for any puddles of the mixture on the top surface of the soil to be absorbed into the soil below the top surface;

wherein the waiting step is conducted for a time period that is less than the time required for the top surface of the soil to dry;

additionally comprising testing the extent of penetration of the PAM below the top surface of the soil of the land area;

wherein the testing step includes removing a core sample of the soil from the land area;

additionally comprising the step of terminating the application of the mixture when PAM penetrates below a top surface of the soil;

additionally comprising comparing the depth penetration of the PAM below the top surface of the soil of the land area to a set of minimum depth penetration values based upon the general slope of the land area to determine the minimum depth penetration needed for the land area being treated before terminating application of the mixture to the land area; and additionally comprising the step of considering the relative compaction of the soil of the land area, and increasing a number of times of applications of the mixture if the top surface of the soil of the land area has a compacted crust for loosening the compaction of the soil to enhance the penetration of subsequent applications of the mixture into the soil.

41. The method of claim 40 additionally comprising establishing the uniform mixture ratio for a mixture of PAM and water to be applied to a land area;

wherein the establishing step includes mixing PAM and water in a ratio of about 1 part PAM to between about 500 and about 5000 parts water by volume.

42. The method of claim 26 wherein the mist application of the mixture is produced by directing a spray of the mixture into the air above the top surface of the soil of the land area; and wherein further applications of the series of applications are produced by directing a spray of the mixture downwardly onto the top surface.

43. The method of claim 26 wherein the mist of the mixture is applied to the top surface of the soil of an entirety of the land area.

44. A method of applying polyacrylamide (PAM) for stabilizing soil particles of a land area from erosive movement about the land area, the method comprising:

mixing PAM with water to form a mixture for application to the land area;

applying the mixture to a top surface of soil of the land area until the soil of the land area becomes saturated, and stopping the application of the mixture when the top surface becomes saturated and the mixture accumulates on the surface rather than being absorbed into the ground and the mixture on the top surface reflects ambient light; and terminating the application of the mixture when PAM penetrates below a top surface of the soil.

45. The method of claim 44 additionally comprising the step of establishing a uniform mixture ratio for a mixture of PAM and water to be applied to a land area, and wherein the mixture formed by the mixing step has a ratio of PAM and water corresponding to the uniform mixture ratio.

46. The method of claim 45 additionally comprising the step of calculating a total application rate for applying the mixture to the land area, and additionally comprising the step of determining a number of times that the mixture of the uniform mixture ratio needs to be applied to the land area to achieve the calculated total application rate of the PAM.

47. The method of claim 44 additionally comprising the step of calculating a total application rate for applying the mixture to the land area, and wherein the applying step comprises making a series of applications of the mixture to the surface for a number of times until the application rate for the soil of the land area is achieved.

48. The method of claim 44 additionally comprising the step of performing a second application of the mixture to the top surface of the soil after the step of stopping the application, the step of performing the second application occurring after a time period needed for the accumulation of the mixture on the surface to be absorbed into the soil.

49. A method of applying polyacrylamide (PAM) for stabilizing soil particles of a land area from erosive movement about the land area, the method comprising:

mixing PAM with water to form a mixture for application to the land area;

applying the mixture to a top surface of soil of the land area by misting a first portion of a total application rate of PAM onto the surface of the land area to produce a tack coat for initially stabilizing topmost soil particles on the top surface of the land area against soil particle movement caused by subsequent PAM applications;

terminating the application of the mixture to the top surface of the soil after the misting of the first portion of the total application rate; and applying a second portion of the total application rate of PAM in a granular form of PAM to the soil on which the mixture was misted.

50. The method of claim 49 wherein the step of terminating the application of the mixture to the top surface of the soil is continued until substantially any accumulations of the mixture on the top surface of the soil have been absorbed into the soil.

51. The method of claim 50 wherein the step of terminating the application of the mixture to the top surface of the soil is discontinued before the mixture dries on the top surface of the soil.

52. The method of claim 49 additionally comprising a step of resuming application of the mixture to the top surface of the soil, after the step of applying the second portion of PAM in a granular form is completed, is performed.

53. A method of applying polyacrylamide (PAM) for stabilizing soil particles of a land area from erosive movement about the land area, the method comprising:

calculating an application rate for applying a mixture of PAM and water to the soil particles of the land area based upon characteristics of the soil particles of the land area;

mixing PAM with water according to a mixture ratio to form a mixture for application to the land area;

determining a number of applications of the mixture to the land area needed to substantially achieve the application rate for the land area; and applying the mixture to a top surface of soil of the land area in a series of at least two applications of the mixture to the surface for the number of applications until the application rate for the soil of the land area is substantially achieved.

54. A method of applying polyacrylamide (PAM) for stabilizing soil particles of a land area from erosive movement about the land area, the method comprising:

initially applying a mixture of PAM and water to a top surface of soil of the land area;

terminating the initial application of the mixture; and making, after a time period passes after terminating the application, at least one additional application of the mixture to the top surface of the soil;

wherein the initial application includes misting a portion of the total application rate of the mixture onto the surface of the land area.

55. The method of claim 54 wherein terminating the initial application is performed when PAM reaches sufficient depth penetration below the top surface of the soil.

56. A method of stabilizing soil particles of a land area from erosive movement until turf is established on the land area by applying polyacrylamide (PAM) to the soil particles of the land area, the method comprising:

initially applying a mixture of PAM and water to a top surface of soil of the land area;

terminating the initial application of the mixture;

making, after a time period passes after terminating the application, at least one additional application of the mixture to the top surface of the soil;

wherein the initial application includes misting a portion of the total application rate of the mixture onto the surface of the land area.

57. The method of claim 56 additionally comprising, prior to the initial application of the mixture of PAM and water, obtaining a sample of the soil from the land area to be treated and applying a mixture of PAM and water to the soil sample at at least two different application rates at two different times, and observing any movement of the soil of the sample during the different application times.

* * * * *